US 7,624,449 B1

(12) United States Patent
Perriot

(10) Patent No.: US 7,624,449 B1
(45) Date of Patent: Nov. 24, 2009

(54) COUNTERING POLYMORPHIC MALICIOUS COMPUTER CODE THROUGH CODE OPTIMIZATION

(75) Inventor: Frederic Perriot, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 1013 days.

(21) Appl. No.: 10/763,673

(22) Filed: Jan. 22, 2004

(51) Int. Cl.
*G06F 11/00* (2006.01)
*G06F 12/14* (2006.01)
*G06F 12/16* (2006.01)
*G06F 9/45* (2006.01)
*G08B 23/00* (2006.01)

(52) U.S. Cl. .............................. 726/24; 726/22; 726/23
(58) Field of Classification Search ............. 726/22–25; 717/151
See application file for complete search history.

(56) References Cited

U.S. PATENT DOCUMENTS

| | | | | |
|---|---|---|---|---|
| 5,485,575 A | * | 1/1996 | Chess et al. ................... 714/38 |
| 5,659,752 A | * | 8/1997 | Heisch et al. ................ 717/158 |
| 5,734,908 A | * | 3/1998 | Chan et al. .................. 717/154 |
| 5,765,030 A | * | 6/1998 | Nachenberg et al. .......... 714/33 |
| 5,790,867 A | * | 8/1998 | Schmidt et al. ............. 717/155 |
| 5,797,013 A | * | 8/1998 | Mahadevan et al. ......... 717/160 |
| 5,812,854 A | * | 9/1998 | Steinmetz et al. ........... 717/159 |
| 5,826,013 A | * | 10/1998 | Nachenberg ................. 726/22 |
| 5,881,151 A | * | 3/1999 | Yamamoto .................... 726/24 |
| 5,949,973 A | | 9/1999 | Yarom |
| 6,230,288 B1 | * | 5/2001 | Kuo et al. ..................... 714/38 |
| 6,782,487 B2 | * | 8/2004 | Gotoh et al. .................. 714/7 |
| 7,266,844 B2 | * | 9/2007 | Teblyashkin et al. ......... 726/24 |
| 2002/0131404 A1 | * | 9/2002 | Mehta et al. ................ 370/352 |
| 2003/0135791 A1 | * | 7/2003 | Natvig ........................ 714/38 |
| 2003/0149969 A1 | * | 8/2003 | Ogasawara .................. 717/158 |
| 2003/0221121 A1 | * | 11/2003 | Chow et al. ................. 713/200 |
| 2004/0221279 A1 | * | 11/2004 | Lovett et al. ................ 717/151 |
| 2004/0221280 A1 | * | 11/2004 | Bolton et al. ............... 717/151 |
| 2004/0255279 A1 | * | 12/2004 | Rawsthorne et al. ........ 717/136 |
| 2005/0028002 A1 | * | 2/2005 | Christodorescu et al. .... 713/200 |
| 2005/0204384 A1 | * | 9/2005 | Yuen et al. ................... 725/43 |

FOREIGN PATENT DOCUMENTS

WO  WO 01/37095 A1  5/2001

OTHER PUBLICATIONS

Choi, Yang-Seo, et al., "A New Stack Buffer Overflow Hacking Defense Technique with Memory Address Confirmation", Lecture Notes in Computer Science 2288, 2002, pp. 146-159, Spinger Verlog, Berlin and Heidelsberq, Germany.

(Continued)

*Primary Examiner*—Kimyen Vu
*Assistant Examiner*—Randal D Morgan
(74) *Attorney, Agent, or Firm*—Fenwick & West LLP

(57) ABSTRACT

Methods, apparati, and computer-readable media for determining whether computer code (30) contains malicious code. In a method embodiment, the computer code (30) is optimized (40) to produce optimized code; and the optimized code is subject to a malicious code detection protocol. In an embodiment, the optimizing (40) comprises at least one of constant folding (53), copy propagation (54), non-obvious dead code elimination (62,63), code motion (49), peephole optimization (52), abstract interpretation (59,68), instruction specialization (55), and control flow graph reduction (44).

22 Claims, 10 Drawing Sheets

OTHER PUBLICATIONS

Chew, Monica and Dawn Song, "Mitigating Buffer Overflows by Operating System Randomization", Dec. 2000, pp. 1-9, U.C. Berkeley, CA USA.

Randustack web pages [online]. Virtualave.net [first retrieved May 1, 2003]. Retrieved from the Internet: <URL: http://pageexec.virualave.net/docs/randustack.txt>, copy retrieved Mar. 21, 2005 from <http://www.pax.grsecurity.net/docs/randustack.txt>.

Randkstack web pages [online]. Virtualave.net [first retrieved May 1, 2003]. Retrieved from the Internet: <URL: http://pageexec.virualave.net/docs/randkstack.txt>, copy retrieved Mar. 21, 2005 from <http://www.pax.grsecurity.net/docs/randkstack.txt>.

Randmap web pages [online]. Virtualave.net [first retrieved May 1, 2003]. Retrieved from the Internet: <URL: http://pageexec.virualave.net/docs/randmmap.txt>, copy retrieved Mar. 21, 2005 from <http://www.pax.grsecurity.net/docs/randmmap.txt>.

Randexec web pages [online]. Virtualave.net [first retrieved May 1, 2003]. Retrieved from the Internet: <URL: http://pageexec.virualave.net/docs/randexec.txt>, copy retrieved Mar. 21, 2005 from <http://www.pax.grsecurity.net/docs/randexec.txt>.

VMA Mirroring web pages [online]. Virtualave.net [retrieved May 1, 2003]. Retrieved from the Internet: <URL: http://pageexec.virualave.net/docs/vmmirror.txt>, copy retrieved Mar. 21, 2005 from <http://www.pax.grsecurity.net/docs/vmmirror.txt>.

Aho, Alfred V., et al., *Compilers*, Addison-Wesley Publishing Company, USA, revised edition 1988.

Szor, Peter, et al., "Hunting for Metamorphic", Virus Bulletin Conference, Sep. 2001, pp. 123-144, Virus Bulletin Ltd., The Pentagon, Abington, Oxfordshire, England.

Perriot, Frederic, "Defeating Polymorphism Through Code Optimization", paper given at the Virus Bulletin Conference, Sep. 26-26, 2003, pp. 142-159, Toronto, Canada, published by Virus Bulletin Ltd., The Pentagon, Abington, Oxfordshire, England.

\* cited by examiner

COUNTERING POLYMORPHIC MALICIOUS COMPUTER CODE THROUGH CODE OPTIMIZATION

TECHNICAL FIELD

This invention pertains to the field of minimizing the impact of malicious code attacks to computer systems.

BACKGROUND ART

In the last decade, dealing with ever more complex polymorphic viruses has been one of the prominent challenges faced by the anti-virus industry. The traditional approach of emulating polymorphic decryption loops to reach the constant virus body underneath is widely regarded as the most powerful defense against polymorphism. Once decrypted, the virus body can be used for detection purposes and lends itself to a detailed analysis. Unfortunately, this approach is computationally expensive and reaches its limits when faced with metamorphic viruses.

The present invention is an alternative solution entailing code optimization (simplification) techniques. Such techniques as copy propagation, constant folding, code motion, and dead-code elimination may be used instead of, or prior to, emulation or other malicious code detection techniques. These turn out to be powerful allies in the fight against malicious code.

DISCLOSURE OF INVENTION

Methods, apparati, and computer-readable media for determining whether computer code (30) contains malicious code. In a method embodiment, the computer code (30) is optimized (40) to produce optimized code; and the optimized code is subject to a malicious code detection protocol. In an embodiment, the optimizing (40) comprises at least one of constant folding (53), copy propagation (54), non-obvious dead code elimination (62,63), code motion (49), peephole optimization (52), abstract interpretation (59,68), instruction specialization (55), and control flow graph reduction (44).

The process of producing an optimized version of the original code (30) automatically suppresses some features that can be a hindrance to human malicious code analysis, like overlapping instructions and cast-away branches.

Optimization (40) is an original way of dealing with polymorphic (10) and other malicious code. The unique ability of optimization (40) to simplify tangled metamorphic code (20) into a readable form can be a crucial advantage in the response to a fast-spreading metamorphic worm (20).

BRIEF DESCRIPTION OF THE DRAWINGS

These and other more detailed and specific objects and features of the present invention are more fully disclosed in the following specification, reference being had to the accompanying drawings, in which:

FIG. 9($b$) is a control flow graph illustrating the code of FIG. 9($a$) after it has been reduced.

DETAILED DESCRIPTION OF THE PREFERRED EMBODIMENTS

As used throughout the following specification including claims, the following terms have the following meanings:

"Malicious computer code" or "malicious code" is any code that is present in a computer without the knowledge and/or without the consent of an authorized user of the computer, and/or any code that can harm the computer or its contents. Thus, malicious code includes viruses, worms, Trojan horses, spam, and adware. At certain places herein, the word "virus" is used generically to include worms and Trojan horses, as well as viruses in the narrow sense.

"Polymorphic" malicious code is code containing one or more decryption loops and an encrypted virus body that is constant once decrypted "Metamorphic" malicious code is code having a non-constant virus body. Metamorphic code may or may not have decryption loops.

"Decryption loop" is a section of code containing instructions to decrypt an encrypted body of the code. The term "decryptor" is often used synonymously with "decryption loop", and sometimes used slightly more generically than "decryption loop".

"Body" or "virus body". of malicious code is that section of the malicious code that performs the malicious purposes of the code.

"Pattern matching" is a technique for recognizing malicious code by looking for patterns or sequences of bits (e.g., signatures) within the code.

"Coupled" means any direct or indirect communicative relationship.

Figure 1:
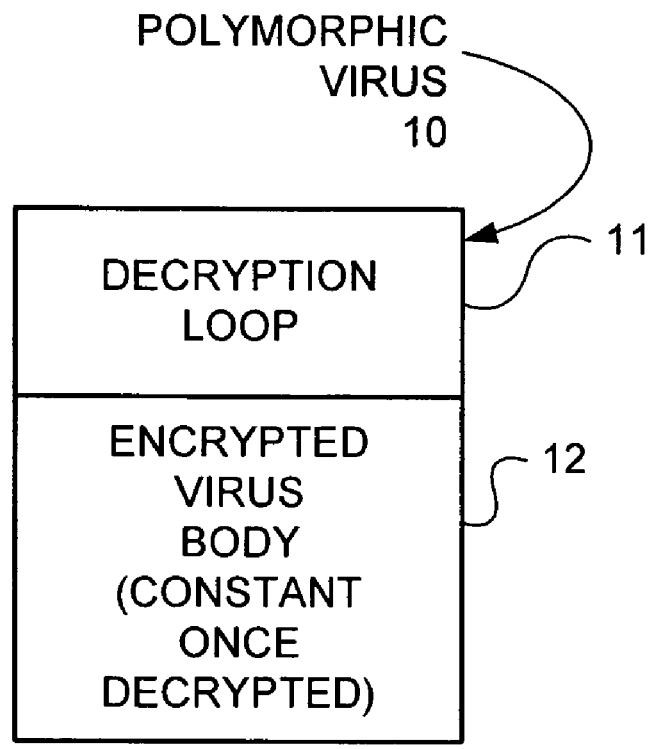
FIG. 1 is an illustration of polymorphic malicious computer code 10.
Figure 2:
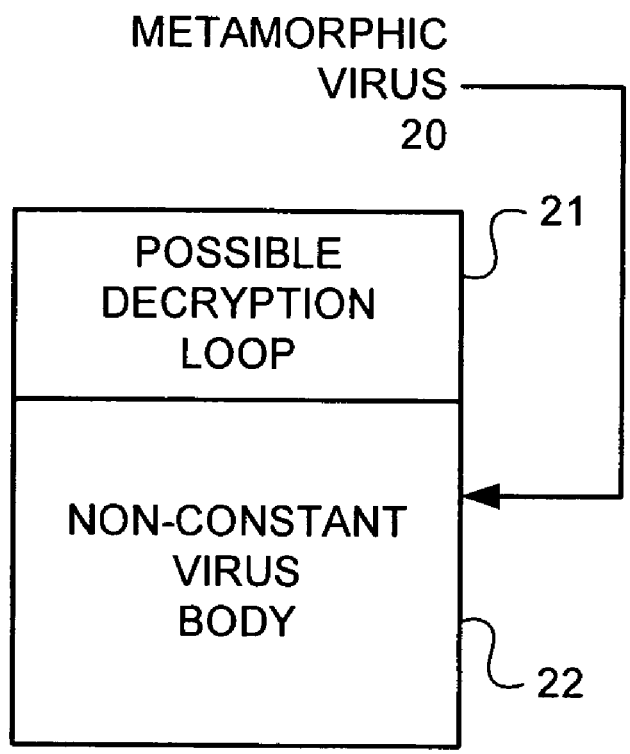
FIG. 2 is an illustration of metamorphic malicious computer code 20.
Figure 3:
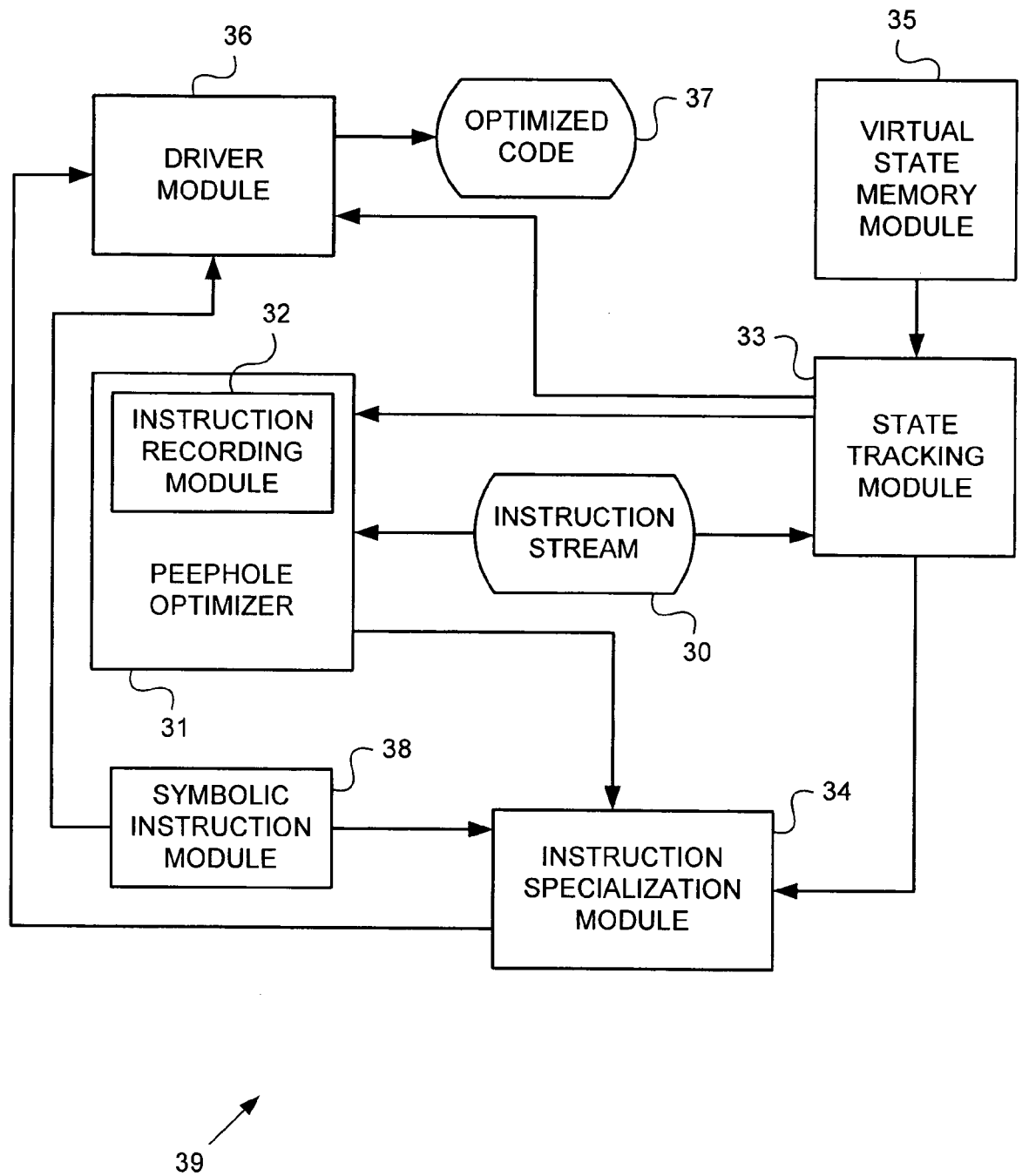
FIG. 3 is an illustration of apparatus suitable for carrying out the present invention.

All of the modules illustrated herein, such as modules 31-36 and 38 illustrated in FIG. 3, can be implemented in software, hardware, firmware, and/or any combination thereof. When implemented in software, these modules can reside on any computer-readable medium or media such as a hard disk, floppy disk, optical disk, etc.

A method embodiment of the present invention determines whether computer code 30 contains malicious code. The method comprises the steps of optimizing 40 the computer code 30 to produce optimized code; and subjecting the optimized code to a malicious code detection protocol. The malicious code detection protocol can be any protocol for detecting malicious code. Thus, the protocol can be pattern matching, emulation, checksumming, heuristics, tracing, X-raying, algorithmic scanning, or any combination thereof. "Algorithmic scanning" is the use of any custom designed algorithm by which one searches for malicious code. The optimizing 40 comprises performing one or more of the following techniques: constant folding 53, copy propagation 54, non-obvious dead code elimination 62,63, peephole optimization 52, code motion 49, abstract interpretation 59,68, instruction specialization 55, and control flow graph reduction 44. Two or more of these techniques may be combined synergistically.

The invention has particular applicability to computer code 30 that is polymorphic 10 or metamorphic 20. When the code 30 is polymorphic 10, in one embodiment the optimizing step 40 comprises optimizing just the decryption loop 11, or possibly several decryption loops 11 if the malicious code 10 employs several encryption layers. This is because the viral body 12 is normally written in an already optimal form by the creator of the malicious code 10.

When the computer code 30 comprises a decryption loop 11,21 and a viral body 12, 22, one method embodiment of the present invention comprises the steps of optimizing 40 the decryption loop 11,21 to produce optimized loop code; performing a malicious code detection procedure on the optimized loop code; optimizing the body 12, 22 to produce optimized body code; and subjecting the optimized body code to a malicious code detection protocol. This embodiment is particularly useful when the computer code is metamorphic 20. When the computer code 30 comprises more than one decryption loop 11, 21, one method embodiment of the present invention comprises the steps of optimizing 40 the outermost decryption loop 11,21 to produce optimized loop code; performing a malicious code detection procedure on the optimized loop code; decrypting the outermost layer, for instance by emulating the optimized loop code; then proceeding in the same way for the second decryption loop, third decryption loop, etc. . . . and all the following innermost encryption layers, until the body 12, 22 is decrypted; optimizing the body 12, 22 to produce optimized body code; and subjecting the optimized body code to a malicious code detection protocol. The malicious code detection procedure can be pattern matching, emulation, checksumming, heuristics, tracing, or algorithmic scanning. The malicious code detection protocol can be pattern matching, emulation, checksumming, heuristics, tracing, X-raying, or algorithmic scanning. The step of optimizing the body can entail using one or more outputs from the step of optimizing the decryption loop and/or the step of performing a malicious code detection procedure on the optimized loop code. When the step of performing a malicious code detection procedure on the optimized loop code indicates that the analyzed code 30 contains malicious code, the steps of optimizing the body and subjecting the optimized body code to a malicious code detection protocol can be aborted. The method can comprise the additional step of revealing encrypted body code. This can be done by emulation or by applying a key gleaned from the optimized loop code.

I. Optimization Techniques and their Application to Polymorphic Code 10 and Other Code 30 that May Contain Malicious Code.

In this section, we look at specific optimization techniques usable in the present invention, and see how each one of them can be applied to the simplification of polymorphic 10 and other code.

In the following paragraphs, we use two notations for code. One is the classic three-address statement notation often used to describe intermediate code produced in compilers. For instance, the statement:

x:=y+z performs the addition of variables y and z and stores the result in variable x.

We also use the Intel syntax for x86 microprocessor assembly code. For instance the instruction:

add eax, ebx performs the addition of registers eax and ebx, stores the result in register eax, and sets the processor flags accordingly. (Note that the left operand is the destination.) When using the term "instruction" within this specification, we refer to processor instructions from the Intel x86 instruction set.

USES AND DEFINITIONS

Before proceeding to look into optimization techniques, it is useful to start with the definitions of some common terms.

The "uses" of a statement or instruction are the variables whose values are used when the statement or instruction is executed. The "definitions" are the variables whose values are modified when the statement is executed. Variables include registers, processor flags, and memory locations.

For instance, the statement:

x:=y+z uses variables y and z, and defines variable x. We also say that the statement "kills" any previous definitions of variable x.

The x86 instruction:

add eax, ebx uses registers eax and ebx, and defines register eax as well as the overflow, sign, zero, carry, parity, and auxiliary carry flags of the processor. Notice that although the alteration of the flags is just a side effect of the addition, the flags are listed in the definitions set of the instruction.

The instruction:

mov byte [edi+esi], 3 uses registers edi and esi, and defines whatever memory location the effective address "edi+esi" points to. (Note that even though registers esi and edi appear in the destination operand of the mov instruction, they are used and not defined.) Depending on the context, we may be able specify the exact memory location that this instruction defines, or we may have to do a conservative estimate of its definitions set.

Control Flow and Basic Blocks

The control flow of a program describes the possible paths it can go along when it is executed. If an execution of a program reaches a conditional branch, such as the "jz" instruction in the following case:

label__0:
  inc esi
  cmp esi, 10
  jz label__2 label__1:
  add esi, 3 label__2:
  mov edi, esi
  ret

Example 1

Figure 8:
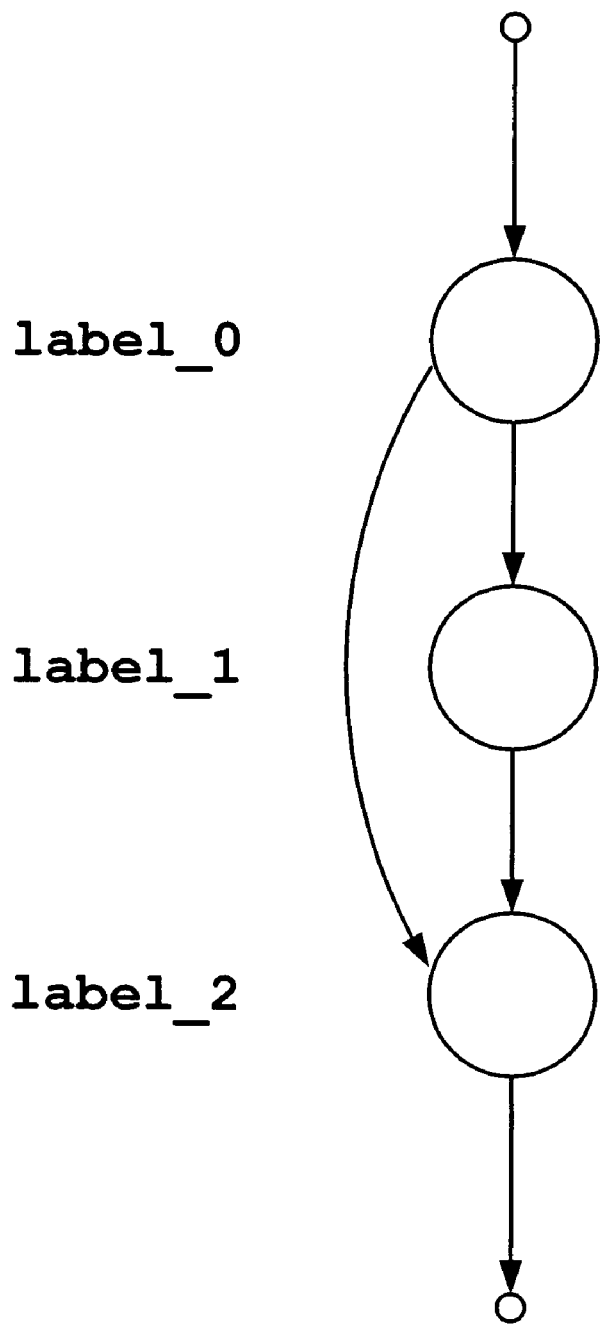
FIG. 8 is an example of a control flow graph.

This is graphically illustrated in FIG. 8. On this control flow graph, the nodes represent instructions or group of instructions; and the degrees represent all possible execution paths.

The conditional jump "jz" can be taken or not, depending on the value of register esi. We say that the control flow diverges.

We define a basic block as a contiguous set of instructions not interrupted by a branch or the destination of a branch. In the example above, there are three basic blocks: The three instructions between "label__0" and "label__1" form a basic block, so does the single instruction between "label__1" and "label 2", and so do the two instructions after "label_2." We often use the term "block" instead of "basic block" in the following text.

The successors of a basic block B are the blocks to which control may flow immediately after leaving block B. The predecessors are defined in a similar manner.

Live and Dead Sets

We say that a variable is live at one point in the program if its value can be used later on during the execution of the program. Otherwise, we say that the variable is dead.

For instance, in the example above (example 1), register esi is live on entry into the second basic block, that is at point "label_1," because its value is used in the execution of the instruction "add esi, 3.". On the other hand, register edi is dead at "label_1," because its value can never be used before it is defined by the instruction "mov edi, esi."

From the set of live variables at the end of a basic block, it is possible to derive the set of live variables at the beginning of the block by working our way up through the instructions of the block, from the last one to the first one, and applying repeatedly the following data-flow equation. If an instruction I uses the set of variables U and defines the set of variables D, the relation between the live set on entry into I and the live set on exit from I is given by the equation:

Live set on entry=(Live set on exit−$D$)∪$U$

In other words, a variable is live before the instruction if it is either used by the instruction, or not killed by the instruction and live after the instruction.

Another data-flow equation gives the relation between live variables sets across basic blocks. If block B has successors S1, S2, . . . , Sn, then the live set on exit from B is the union of the live sets on entry into the Si's.

Live set on exit from block=∪over all successors $Si$
(Live set on entry into $Si$)

In other words, a variable is live on exit from a block if it is live on entry into at least one successor of the block.

Most of the time, the live sets can be computed in linear time, in less than three passes for typical programs.

Dead Code Elimination

If the definitions set of an instruction contains only dead variables at the point after the instruction, we say that the instruction itself is dead. In such a case, the instruction can be removed from the program without changing the meaning of the program.

This transformation is named "dead code elimination". Why would a program contain dead code? Dead code may result from high-level constructs if the programmer overlooked an unneeded variable assignment, but it also very often appears as the result of other optimization techniques we will describe shortly.

In polymorphic code 10 produced by viruses, dead code is commonplace. For instance, consider the following snippet of code from a polymorphic decryptor 11 generated by Win32/Junkcomp.

lea ecx, ds:0ABC5E94Fh dec cl sub al, 0CEh lea edx, ds:0A979D43Ch inc cl or al, 0AFh lea ebp, ds:0BF8E8B60h or bl, 0B5h bsf ebx, eax mov edi, 0B4FA9CF7h rcr dh, 4Eh bts edi, ebx imul ebx, esi, 68F2BD76h mov ecx, 0D6FC939Eh Since the last instruction defines register ecx, and ecx is used nowhere in the code before this last definition, the three previous instructions defining ecx or cl are good candidates for dead code elimination. The only catch is that they may also define flags, so we must verify that the flags are also dead after these instructions before we can safely remove them. "lea" does not touch the flags. The flags from "dec cl" are killed by the following "sub" and those from "inc cl" are killed by the following "or". Therefore, it is safe to eliminate these instructions.

The benefits from dead code elimination are numerous. Suppose the instruction stream above is part of a decryption loop 11, and the loop 11 has to be emulated to decrypt the virus body 12. Removing the dead instructions from the loop 11 and then emulating the resulting, simpler code makes the emulation faster. Dead code elimination itself has a cost, but the savings easily outweigh the cost in most cases, since dead code elimination takes place only once, whereas the removed loop instructions might have been executed thousands of times.

As used herein, "non-obvious" dead code elimination means removing dead code other than a nop ("no operation") or a simple operation such as cli, sti, clc, stc and others commonly used as single-instruction nop's.

Note that emulation of optimized code is slightly different from regular emulation, as the interpreted instructions are not fetched from the emulated memory. Instead, they are fetched from a structure 38 unrelated to the memory that holds symbolic representations of processor instructions, typically a set of nodes in the shape of a control flow graph (see FIG. 3). The optimized instructions may not even have a binary representation. The advantage of this approach is that the memory holding the original code remains unchanged, and the decryption process works even if the bytes of the decryptor 11,21 themselves are used as a decryption key, as is the case in some viruses 10,20.

If the detection algorithm for the virus is based on loop 11,21 recognition, dead code elimination helps too, by removing unneeded or redundant instructions, thus exposing the more meaningful parts of the code for easier pattern matching. (See the Win32/Dislex example of Illustration E below.) Characteristics of the eliminated instructions, such as the statistic distribution of opcodes in dead code, may also be used for detection.

Another benefit of dead code elimination is that it may eliminate some anti-emulation code designed to stop antivirus programs. The following snippet of code is taken from the decryptor of Win32/Hezhi.A.

push edx push edx lar edx, eax pop edx popf

The "lar" instruction is a rarely used instruction that loads the access rights of a descriptor into a register and modifies the zero flag of the processor. Its presence in the decryptor of the virus is destined to cause some emulators to stop, since they may not know how to emulate the instruction correctly. However, since both edx and the zero flag are dead on exit from the instruction, the "lar" could be discarded as dead code, and the emulation of the optimized code could take place even without proper support for this esoteric instruction.

Fake import calls may also be eliminated this way if their return values are dead and they have no side effects. (This is unfortunately not the case for Win95/Drill, since it uses the return values of its fake calls to GetModuleHandle, GetTickCount, and other win32 APIs.)

Constant Folding

Constant folding consists in replacing expressions that involve only constants by their calculated results, to avoid evaluating them at run time. For instance, the following high-level language statement lends itself to constant folding.

$i=1000+2*3$

Rather than generating the code for the multiplication and the addition, a clever compiler will evaluate the value of the expression on the right-hand side of the statement at compile time and generate code for this simple assignment instead:

i=1006

In the context of assembly language, expressions are not apparent, but the idea is the same. Constant folding consists in replacing occurrences of a variable that is known to assume a constant value with the value itself.

The following assembly code taken from a sample of Win32/Zmist.A serves to illustrate the transformation:

xor eax, eax sub eax, 87868600 push eax

After the "xor," register eax holds the value 0. After the "sub," eax holds the value 78797a00. Thus, we can replace the occurrence of variable eax in the "push" instruction with its constant value at this point, and rewrite the code as:

xor eax, eax sub eax, 87868600 push 78797a00

In doing so, we remove register eax from the uses of the "push" instruction, which may have the side effect of exposing dead code. This is an example of the synergy mentioned above. Suppose register eax and the flags defined by the "sub" are dead after the "push." We could then get rid of the "xor" and the "sub" by dead code elimination.

The process of constant folding is very similar to emulation. Evaluating an expression written in assembly language is essentially equivalent to performing a partial emulation of the instructions involved in computing the expression.

It is a common feature of many polymorphic viruses 10 (and metamorphic viruses 20) to avoid direct use of constants by replacing them with series of instructions producing the desired result. The absence of constants such as looping factors, memory addresses, and decryption keys makes the detection of polymorphic decryptors 11 more difficult. Constant folding can help recover these features.

To illustrate the benefits of constant folding further, let us use an example related to heuristic detection. Suppose a heuristic engine attempts to detect viral-looking code by searching for small suspicious code snippets. One such snippet may be:

cmp word [???+18], 10b jnz ???

Example 2

This piece of code may appear in the infection routine of viruses that check the COFF signature field at offset 18 (hexadecimal) of the PE header before infecting a file. The question marks designate wildcards for a base register and a branch destination.

A common anti-heuristic trick for a virus would be to use a slight variant of the code with an equivalent meaning but a different signature such as:

```
mov   ax, 10a
inc   ax                          ; ax now holds value 10b
cmp   word [ebx+18], ax
jnz   dont_infect
```

Similar tricks have been played against TBScan in the past.

By applying the constant folding transformation described above and then applying the heuristics to the optimized code, the anti-heuristic trick can be circumvented.

Copy Propagation

When a program statement moves the value of a variable into another variable, we say it creates a copy of the variable. The copy is valid as long as both variables remain unchanged.

For instance, consider the following statements:

x:=y z:=u+x y:=U+z x:=y+v

The first statement creates a copy of variable y into variable x. The third statement invalidates the copy, because variable y is redefined.

Copy propagation consists in replacing the variables that are copies of other variables with the originals. In the example above, copy propagation yields the following result:

x:=y z:=u+y y:=u+z x:=y+v

The instance of variable x in the original second statement has been replaced with y, of which it is a copy.

Like constant folding, copy propagation can create new opportunities for dead code elimination. This is another example of the synergy mentioned above. In this example, after removing the reference to variable x in the second statement, the first statement becomes dead code.

In polymorphic code 10, copies are often redundant and can be eliminated. This makes the code 10 clearer to read, easier to parse, and faster to emulate. Look at these few instructions generated by Win32/Simile.A as part of its polymorphic decryptor 11:

mov ecx, dword [esi+4000e000]

mov dword [40023ee2], ecx push dword [40023ee2]

pop dword [40024142]

push dword [40024142]

pop dword [40023c60]

xor dword [40023c60], 8a00e5ca

All the first six instructions do is move a value around before it is finally decrypted by the "xor".

After copy propagation, the code becomes:

mov dword [40023c60], dword [esi+4000e000]

xor dword [40023c60], 8a00e5ca

This is both easier to understand and faster to emulate. (The double memory-addressing mode of the "mov" is a natural extension of the x86 instruction set.)

Notice that copy propagation should not be done for destination operands. The original code is not equivalent to the following instruction!

xor dword [esi+4000e000], 8a00e5ca

Code Motion

One of the goals of optimizing compilers is to produce better code for the parts of a program that are going to be executed the most often. In the absence of programmer hints, it is reasonable enough to attempt optimizing loops the most, especially inner loops.

One way to achieve faster loop execution is to move the computation of values that do not change across iterations (so called loop invariants) outside of the loop. For example, assume the following instructions form a decryption loop 11,21:

decrypt
   mov ebp, [key]
   xor [esi], ebp
   add esi, 4
   loop decrypt

If we can prove that the memory location holding the key is not affected by the "xor," we know that register ebp will assume the same value on each loop iteration. Therefore, we can place the initialization of ebp before the loop like this:
   mov ebp, [key]

decrypt:
   xor [esi], ebp
   add esi, 4
   loop decrypt:

The resulting loop has three instructions instead of four, so it will be faster to emulate.

Moving computations earlier in the control flow is a common type of code motion, but it is not the only one. Some other similar transformations delay the execution of statements, and possibly duplicate statements, also in an attempt to improve the code in loops.

Here we do not discuss the recognition of loops or the exact conditions to use code motion safely. It is enough to rely on the intuitive idea of a loop to see the value of the code motion transformation above.

Peephole Optimization

A peephole optimizer 31 is a component that looks at the input stream of machine instructions 30 and makes opportunistic modifications to the stream 30 by removing, replacing, or combining instructions. The peephole optimizer 31 does not know about the meaning of the code 30. It just makes simple transformations based on a low-level view of the code 30.

The peephole optimizer 31 typically knows a lot about the target architecture, so it can take advantage of special addressing modes and other machine idioms. It may also get rid of back-to-back stores and loads of the same variable, and implement some simple algebraic identities.

When dealing with polymorphic code 10, a peephole optimizer 31 can be very useful as the first step 52 of the optimization process 40, as part of an instruction decoder. Polymorphic code 10 is often littered with small sequences of instructions that cancel each other, such as back-to-back negations, complements, or an increment followed by a decrement.

Consider a typical example (taken from Win32/Hezhi):

rol edx, 1 ror edx, 1

The two rotations cancel each other. When the peephole optimizer 31 reaches the location of the "rol," it can look-ahead by one instruction and see that the next instruction is a "ror" of the same register by the same amount, and return a "nop" instead of the "rol." However, doing this implies an implicit assumption that the flags set by "ror" are dead on exit from the "ror." This must be carefully verified, either by doing some limited live variable analysis before validating the peephole optimization 52, or by guessing that the flags are dead, and verifying it later in the instruction decoding process. If the assumption about the dead flags turns out to be false, the optimization 52 has to be reversed.

Note that this optimization 52 should not preclude the "ror" instruction from being decoded separately at the beginning of a new basic block later on, if it turns out to be the destination of a branch. This peephole optimization 52 is for the instruction sequence starting at the "rol" instruction.

A useful peephole optimization 52 is the transformation of push/pop sequences into mov's (see Win32/Simile example in Illustration F below). This removes the dependency on the stack and introduces more optimization opportunities. However, it can be risky to transform code this way in some contexts, as we will see in detail in a later section.

Many similar peephole optimizer 31 tricks can be played, and these will be apparent to people who have some experience working with polymorphic viruses 10. One other case deserves special mention though, the case of back-to-back conditional branches.

Two contiguous conditional jumps to the same location that test for complementary conditions (like a jz/jnz pair) can be replaced with one unconditional jump. In a pair of two contiguous conditional jumps that test for complementary conditions but have different destinations, the second jump can be replaced with an unconditional jump. Jumps with zero offsets can be replaced with nops. These transformations are all simple, but they are very useful because they simplify the control flow of the code 30.

In some cases, peephole optimization 52 over a long sequence of instructions might be necessary (for instance for nested push/pop pairs). Implementing the peephole optimizer 31 as a shift-reduce parser helps.

Local Vs. Global Optimization

An optimization is said to be local if it is done at the level of a basic block. It is said to be global if it uses information propagated across basic blocks boundaries. Dead code elimination, constant folding, and copy propagation can all be done locally or globally.

Local optimizations are less costly and can typically be done in linear time. Most interesting global data-flow problems are proven to be NP-complete, but there is empirical evidence that some can be solved by fast algorithms, at least for programs with a usual control flow structure (and, in this context, polymorphic code 10 does have a usual structure!).

In the examples of polymorphic code 10 optimization presented in the Illustrations that are given below, almost all the transformations that were used were local ones, and they gave very good results. Global dead code elimination 63 was the only global optimization implemented, and it brought marginal improvement over local dead code elimination 62.

It should be noted, however, that two tricks were used to boost local optimizations without paying the extra cost in complexity associated with global optimizations. First, unconditional branches to blocks with only one predecessor were eliminated. This technique is sometimes called "jump removal", and defeats a common type of polymorphism that consists in slicing the code to obfuscate it into little pieces linked together by jumps (see for instance Illustration A on Win32/Zperm.)

Secondly, conditional branches whose conditions fell prey to local optimizations were replaced with jumps or nop's (depending if the branch is always or never taken). Look at this example produced by Win32/Simile.A:

mov dword [4002372a], esi cmp esi, dword [4002372a]

jnz 4000b2d9

The comparison must always succeed, so the jump is never taken. After copy propagation and instruction specialization, this code became:

mov dword [4002372a], esi cmp 0, 0 nop

Ripe for dead code elimination once the flags of the "cmp" are proven unused.

Abstract Interpretation

Abstract interpretation, also called abstract debugging, can be a powerful technique. It consists in modeling the behavior of a program by assigning abstract values to its variables, and interpreting a version of the program where all operators are considered to work on the abstract values of the variables, rather than concrete values they would assume during an execution. Such modeling can help to prove the correctness of programs.

Without going into details, let us demonstrate the usefulness of abstract interpretation on an example. Going back to the heuristic detection pattern already discussed previously (see example 2)

cmp word [???+18], 10b jnz ???

We already saw one way to evade heuristic detection by hiding the constant 10b. Another way could be to frame the value at offset 18 from above and from below using two successive comparisons.

cmp word [ebx+18], 10a jbe dont_infect cmp word [ebx+18], 10c jae dont_infect

When control reaches the point after the "jae," the word at offset 18 is both greater than 10a and less then 10c; therefore, it is 10b. To detect it automatically and simplify the code, we can use an abstract interpretation where variables assume abstract values that are intervals of numbers. If the abstract variable x has the abstract value [3 . . . 14] at one point in the program, it means that the real variable x can have a concrete value only between 3 and 14 at this point of the program during any execution of the program.

We are interested in the abstract value of the word at [ebx+18], so we will annotate the instructions above with the abstract value of this word. On entry into the first comparison, we know nothing about the word, so we will assume it can take any value, that is, its abstract value is the interval [0 . . . ffff]. The same is true on entry into the "jbe."

| | | |
|---|---|---|
| cmp | word [ebx+18], 10a | ; [0..ffff] |
| jbe | dont_infect | ; [0..ffff] |

On entry into the second comparison, the "jbe" branch has not been taken, which reduces the possible range for the word to a smaller interval.

| | | |
|---|---|---|
| cmp | word [ebx+18], 10c | ; [10b..ffff] |
| jae | dont_infect | ; [10b..ffff] |
| ; [10b..ffff] ∩ [0..10b] = [10b..10b] | | |

Finally, on entry into the instruction following the "jae," since the second conditional jump has not been taken, the word at [ebx+18] can only be in interval [0 . . . 10b]. Since we already know it is in interval [10b . . . ffff], the word can only have value 10b.

After determining this equality, we can introduce a piece of code that makes this assertion explicit in the form of an extra conditional jump that we know can never be taken. We deliberately choose the "dont_infect" label as the destination of this conditional jump, to create optimization opportunities. The resulting code is:

cmp word [ebx+18], 10a jbe dont_infect cmp word [ebx+18], 10c jae dont_infect cmp word [ebx+18], 10b jne dont_infect We can then apply a simplification rule to the control flow graph of the program. If two back-to-back conditional branching statements have no side effects, the same destinations and one of the conditions implies the other, the weaker of the two conditions may not be tested, and the corresponding conditional branch instruction removed without changing the meaning of the program. In this example, the condition (word [ebx+18]≠10b) implies that (word [ebx+18]≧10c). Therefore, we can remove the second comparison and the jump.

cmp word [ebx+18], 10a jbe dont_infect cmp word [ebx+18], 10b jne dont_infect

Likewise, the first test is weaker than the second, so after applying the same rule once more, we are left with the original pattern that will trigger the heuristic:

cmp word [ebx+18], 10b jne dont_infect

The constant folding optimization described earlier can also be seen as an abstract interpretation.

Program Specialization

Program specialization studies transformations that can be made to a program when some parts of the execution context of the program are known. A special case of program specialization is instruction specialization.

An example of instruction specialization is:

add ebx,eax→add ebx, 1234

The context of the program includes, for instance, the arguments that the program takes. Consider the following program that takes three arguments:

Program P taking arguments i, j, k if (I>j)

print k+2;

else print i+j

The specialization of P in the context where argument i=2 is:

Program P' taking arguments j, k if (2>j)

print k+2;

else print 2+j

The specialization of P in the context where argument i=2 and j=1 is

Program P'' taking argument k print k+2;

At the assembly instruction level, the constant folding and copy propagation techniques described earlier are in fact specialization. Thus, when we replace the following sequence of instructions:

mov eax, 2 mov ebx, ecx add [esi+eax], ebx with the simpler sequence mov eax, 2 mov ebx, ecx add [esi+2], ecx

We will say that we have specialized the arguments of the "add," and that we have specialized the instruction itself, based on the contextual information provided by the instructions that precede it.

Another kind of instruction specialization is illustrated in the following example. We can specialize the instruction (taken from Win32/Zmist.A)

xchg esp, esp into a nop instruction, thus emptying its definitions set and making it a candidate for dead code elimination.

II. Architecture of an Optimizer 39

Figure 4:
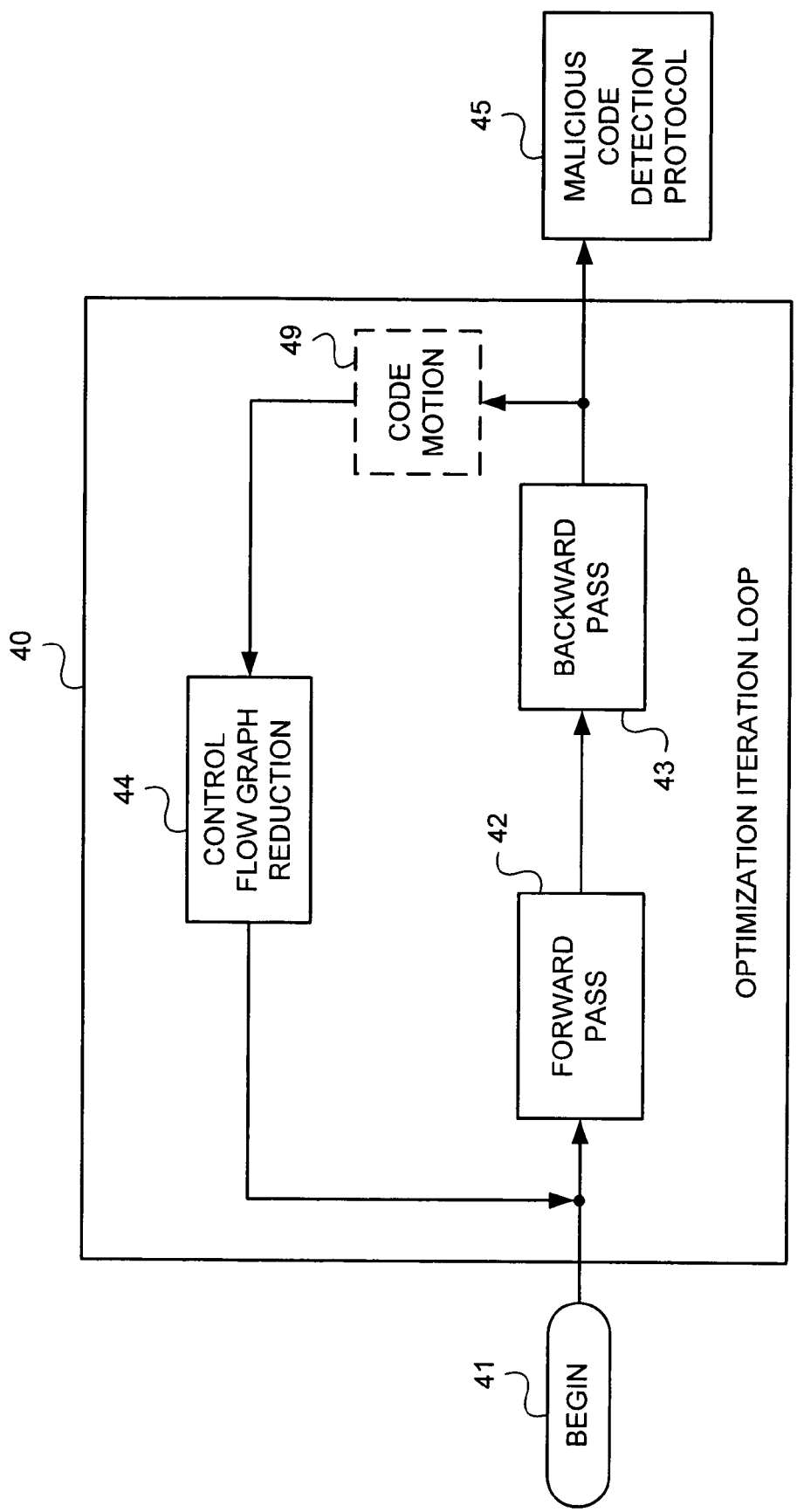
FIG. 4 is an illustration of a method embodiment of the present invention.

FIG. 4 illustrates the overall method of optimization 40. The method begins at step 41, then an iteration loop 42-44, 49 is performed, and then the malicious code detection protocol is performed at step 45. The iteration loop comprises performing a forward pass 42, performing a backward pass 43, performing an optional code motion step 49, and performing a control flow graph reduction 44. The loop 42-44, 49 is iterated for a preselected number of iterations. Alternatively, the iteration of the loop 42-44, 49 is terminated once it is observed that there were no optimizations of the computer code performed in the most recent iteration of the loop 42-44, 49.

Figure 5:
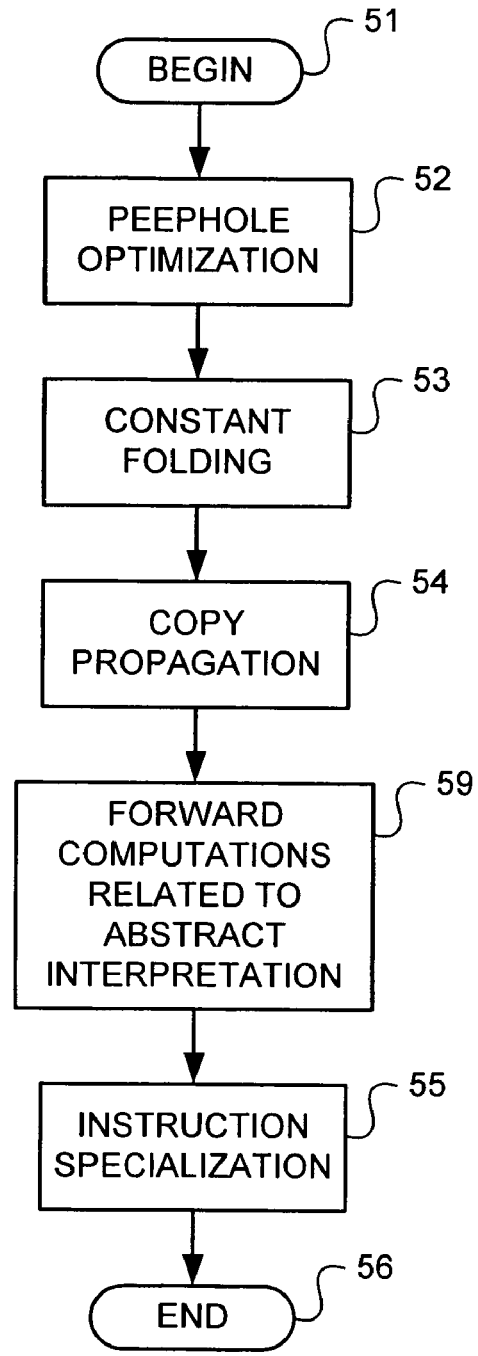
FIG. 5 is an illustration of forward pass steps 42 within the method illustrated in FIG. 4.

FIG. 5 illustrates details of the forward pass procedure 42, in which at least one of the steps of FIG. 5 is performed. The method begins at step 51. A peephole optimization is performed at step 52. Constant folding is performed at step 53. Copy propagation is performed at step 54. The constant folding of step 53 and/or the copy propagation of step 54 can be local and/or global. Typically, local constant folding 53 and/or copy propagation 54 is performed and, if the local techniques result in code 30 simplification, global techniques are then also performed. Forward computations related to abstract interpretation are performed at step 59. Instruction specialization is performed at step 55, and the method ends at step 56.

Figure 6:
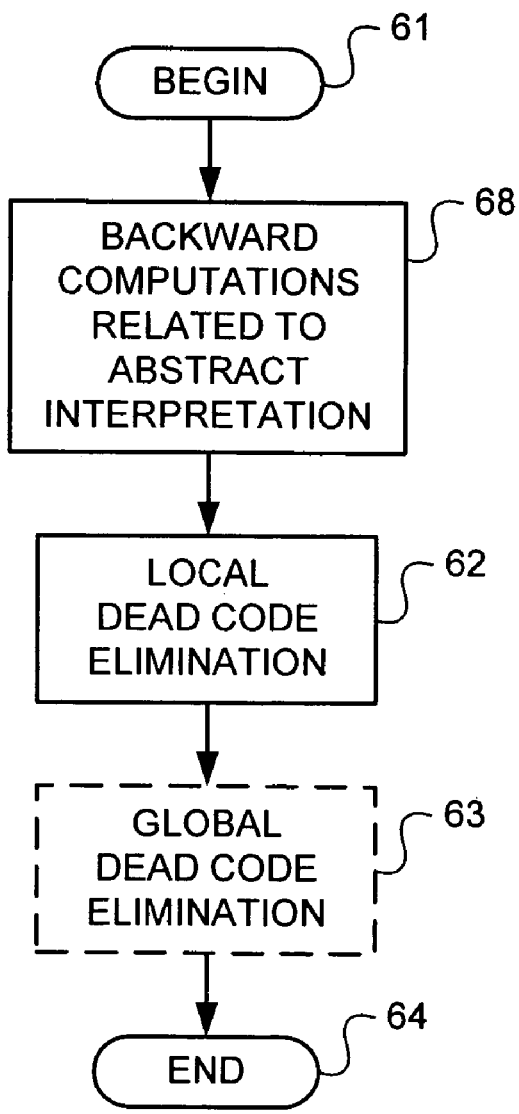
FIG. 6 is an illustration of backward pass steps 43 within the method illustrated in FIG. 4.

FIG. 6 illustrates one embodiment for implementing the backward pass 43 procedure, in which at least one of the steps of FIG. 6 is performed. The method begins at step 61. Backward computations related to abstract interpretation are performed at step 68. Local dead code elimination is performed at step 62. Step 63 (global dead code elimination) is optional. The decision to perform step 63 can be based upon the results of step 62, e.g., if step 62 resulted in code 30 simplification, step 63 is performed. The method ends at step 64.

Figure 7:
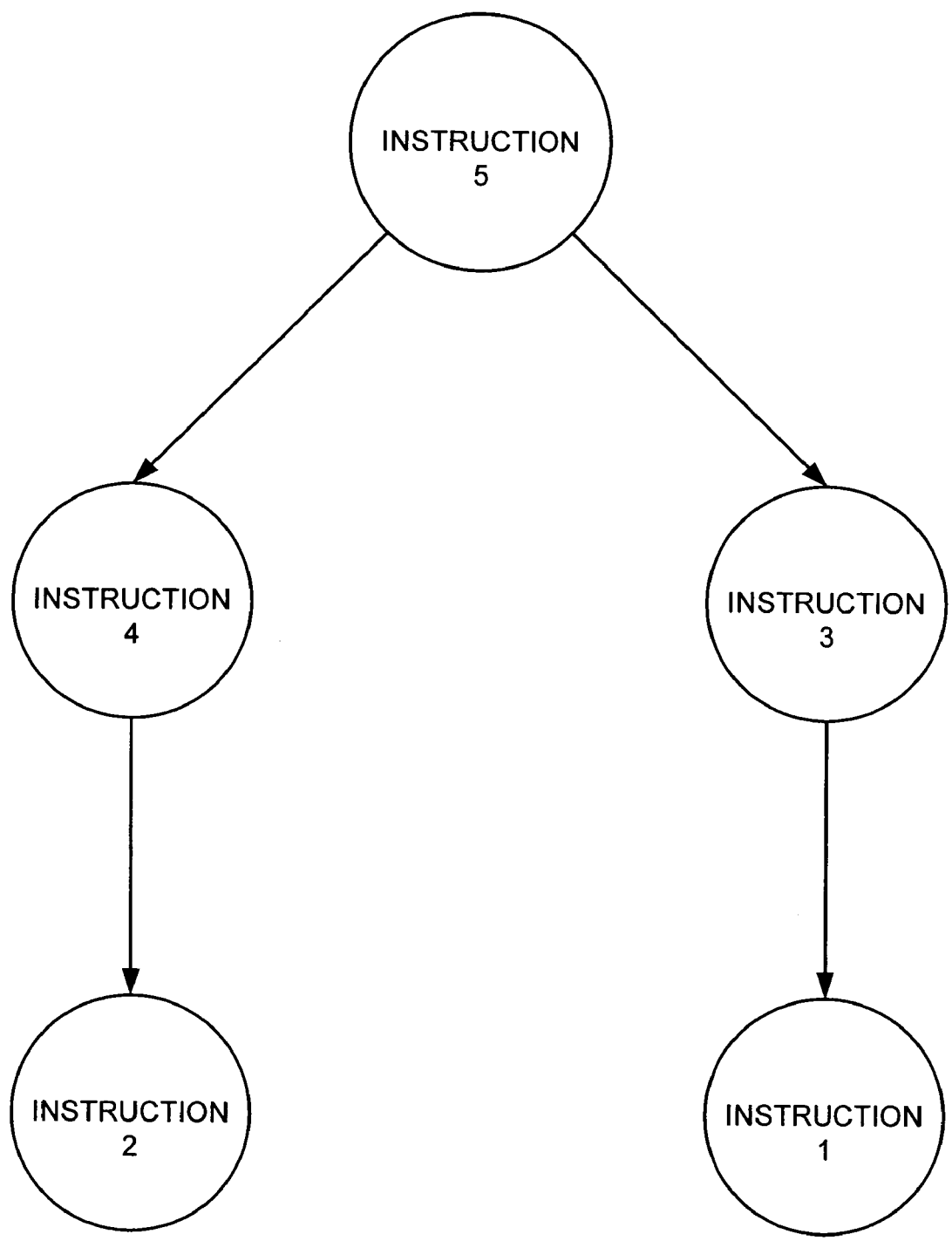
FIG. 7 is an example of a Directed Acyclic Graph (DAG).

FIG. 3 illustrates apparatus that can execute the steps that have been discussed above. State tracking module 33 contains information concerning the status of registers, flags, different areas of memory, stacks, heaps, and state of the operating system. Peephole optimizer 31 interrogates state tracking module 33 regarding the state of the registers, flags, etc. In one embodiment, peephole optimizer 31 contains instruction reordering module 32, which receives the input instruction stream 30, creates therefrom a directed acyclic graph (such as illustrated in FIG. 7), and outputs the instructions in a way that the instructions that are likely to be peephole optimized 52 by remaining portions of the peephole optimizer 31 are next to each other.

Virtual state memory module 35 gives the state of the registers, flags, etc., at each stage of the instruction stream 30. State tracking module 33 is the interface between virtual state memory module 35 and peephole optimizer 31, instruction specialization module 34, and driver module 36.

State tracking module 33 provides input for all of the major steps of the optimization 40.

Driver module 36 performs all of the optimization 40 steps except for peephole optimization 52 and program specialization 55.

Symbolic instruction module 38 holds symbolic representations of processor instructions, typically a set of nodes in the shape of a control flow graph.

The user can provide inputs to the optimization 40 by means of providing initial conditions to state tracking module 33. That gives one the ability to optimize when it would not otherwise be possible, e.g., in cases where the instruction stream 30 contains a buggy virus. For example, the user may conclude by observing the behavior of the virus that certain instructions referencing a certain memory range are dead; and the user then provides this information to state tracking module 33.

Considerations on Code Transformations

During the presentation of the optimization techniques 40 above, we voluntarily skipped over some conditions that are verified in order for the code transformations to be correct. We now revisit some problematic aspects of these techniques in finer detail.

Consider the peephole optimization 52 that transforms a pair of back-to-back push and pop instructions into a mov instruction. The original code may look like the following (taken from Win32/Simile.A)

push dword [40023fb0]

pop eax

It seems safe to simplify this pair of instructions into one mov:

mov eax, dword [40023fb0]

While this transformation (a typical peephole optimization 52) would usually be correct, there are also some special contexts where it is not, among which:
1. If the stack value below the stack pointer is used after the pop.
2. If the access to the memory location [40023fb0] causes an exception.
3. If the stack pointer used by the push instruction is pointing to the pop instruction (that is, the instruction sequence is self-modifying).
4. If the processor is in tracing mode and an interrupt occurs after every instruction.

All of these special contexts could be used as anti-debugging tricks. Win32/Chiton.E (a.k.a. Win32/Efish) checks the value below the stack pointer to see if it has been modified due to a debugger. Some viruses use the Structured Exception Handling mechanism of Windows to transfer control and thus make emulation and analysis more difficult (Win32/Magistr, Win32/Efortune, Win32/Hezhi, Win32/Chiton). Self-modifying code is very common in viruses (all polymorphic viruses 10 decrypt their own code 12). Win32/Perenast executes applications in tracing mode to implement Entry-Point Obscuring. The decompression code of the tELock executable packer runs in tracing mode and keeps count of the number of instructions executed, and then verifies it is below a threshold to ensure no debugger is present.

Drawing from these observations, we should make sure that the context of the push/pop pair is proper before optimizing the pair.
1. Live variable analysis should tell if the stack value below the stack pointer is dead on exit from the pop instruction. This is very often easy to prove if the stack is reused later in the code, since any push will kill this value.
2. Instruction specialization 55 according to constant folding 53 and copy propagation 54 should indicate if the argument of the push is likely to trigger an exception.
3. Constant folding 53 and copy propagation 54 should indicate if the stack pointer was earlier set to point to the code.
4. Analysis of earlier code should reveal if the trap flag of the processor has been set and the processor is in tracing mode when the push/pop sequence is reached.

Of course, the four problems stated above are impossible to solve perfectly (theoretically they are all undecidable). In practice, however, there is a good chance that if the code preceding the push/pop pair explicitly attempts to set up a wrong memory location as the push argument, or to point the stack pointer to the instructions, a code analysis using constant folding 53 and copy propagation 54 would reveal this fact. In the absence of a flagrant sign of such manipulations, the optimization 40 can be done assuming the simplest context.

When optimizing polymorphic virus code 10, best effort is often enough. Optimizing towards exactly equivalent code is a desirable property, for instance to ensure that the emulation of optimized code 37 will yield proper results, but not a necessity as long as the output 37 of the optimizer 39 can be used reliably for pattern matching, checksumming, heuristics, and other kinds of information gathering related to virus detection.

The push/pop example suggests that it is preferable to do at least some part of the peephole optimization 52 after the constant folding 53 and copy propagation 54. However, we said earlier that local constant folding 53 was improved if peephole optimization 52 was used for fake conditional jumps removal. To overcome this dilemma, in one embodiment, there are two peephole optimizer steps 52, one that runs as the first step during the decoding of the machine instructions 30, and one that operates later, when some data-flow analysis 53,54 has already been done. In fact, we can use the same peephole optimizer 31 in several iterations of the loop 42-44, 49.

Another example that illustrates the usefulness of doing live variable analysis before peephole optimization 52 is the application of algebraic identities on back-to-back logic or arithmetic instructions. When consecutive instructions have the same destination argument and a constant source argument, some simplifications may be possible.

The following two instructions (from Win32/Simile.A)

and ebx, bfadfffe and ebx, 6efbfffd can always be optimized to:

and ebx, 2ea9fffc where the new mask on the right-hand side is the bitwise "and" of the two original masks. The optimization 40 is possible regardless of the context because the flags produced by the second "and" of the instruction pair are the same as the flags produced by the optimized "and" in all cases.

On the contrary, the following two instructions:

add ebx, 2 add ebx, 2 cannot, without some context information, be optimized safely to:

add ebx, 4 because the resulting carry flag may differ (consider a case where ebx=ffffffff on entry into the instruction pair.) If previous live variable analysis revealed that the flags are dead after the second "add," the optimization 40 is proper.

Less obvious algebraic identities cannot be detected by a peephole optimizer 31, because they require reordering the terms of expressions. Consider the following example:

mov ecx, eax and eax, ebx not ebx and ecx, ebx or ecx, eax

Whatever the value of register ebx, ecx on exit is a copy of eax on entry.

Dependency DAG Construction and Reordering of Instructions

One limitation of a simple peephole optimizer 31 is that it does not naturally handle optimizations of non-contiguous instruction sequences. Consider the following example:

(I1) push eax (I2) and ebx, ff (I3) pop ecx (I4) and ebx, ff00

(I5) add ebx, ecx

Furthermore, let us assume that the flags and stack are dead on exit from the final "add." Under these conditions, it should be obvious that a first optimization step for this block of code would be to change the push/pop pair into a mov instruction, and to combine the two "and" instructions together:

mov ecx, eax and ebx, 0 add ebx, ecx

From there, copy propagation 54, instruction specialization 55, and dead code elimination 62 easily lead to:

mov ecx, eax mov ebx, eax

Unfortunately, the first optimization step is out of reach for a simple peephole optimizer 31, because none of the pairs of contiguous instructions in the original block can be combined. The problem resides in the intertwined sequences of instructions belonging to parallel dependency chains. To solve this problem, peephole optimization 52 can be applied to the output of a filter 32 that reorders the instructions.

When processing a block of instructions, we build a directed acyclic graph (DAG) where the nodes represent instructions and the edges represent a dependency relationship between the instructions. More exactly, an edge from A to B indicates that some definitions of instruction B reach instruction A and are either used or killed by instruction A. The DAG of the original block above is illustrated in FIG. 7.

Paths of the DAG express the dependency chains between instructions. For instance, instruction 5 must come after both instruction 3 and instruction 4, because it uses results produced by both these instructions. Instruction 3 must come after instruction 1, and instruction 4 must come after instruction 2.

Having built this DAG structure describing all instructions of a block, we can create an equivalent block by visiting the nodes of the DAG and emitting their instructions in postorder, that is, emitting a node by instruction reordering module 32 within peephole optimizer 31, only after all the nodes it points to have been emitted already. The most recently emitted instruction is the first instruction in the block under construction, i.e., the block is created bottom to top.

There are multiple solutions to this problem because, at any moment during the emission of the instructions, there might be multiple available nodes whose descendants have all been emitted. In such a case, we break ties by picking an available node that offers a peephole optimization 52 opportunity with the most recently emitted instruction, if such a node exists. Following the algorithm, the resulting block for the example above exposes the peephole optimization spots quite nicely:

(I1) push eax (I3) pop ecx (I2) and ebx, ff (I4) and ebx, ff00

(I5) add ebx, ecx

The algorithm can be extended to handle cases when a peephole optimization 52 would lead to the creation of new opportunities, like the case of nested push/pop pairs. The choice of available nodes during code emission can also be dependent on other criteria than just peephole optimization. Picking the emitted instructions based on an ordering of the opcodes can help simplify later pattern matching in the resulting block.

Approximation of the Control Flow Graph

The control flow of a program may depend on the data in non-trivial ways. For instance, the program may contain jump tables that implement high-level switch statements. In such a case, code addresses are part of the program data, and a data-flow analysis is required to avoid missing some paths in the control flow.

Jump tables occur naturally in compiled high-level language programs, but some other issues are (almost always) specific to programs written in assembly language, like self-modifying code or idiomatic use of some instruction sequences. One example is the call/pop sequence that appears very frequently in viruses. It can be used to obtain a pointer to some data embedded in the code, in which case the call should really be handled as a jump, because it never returns. Another example is the push/ret sequence that can be used to jump to an absolute address.

Given a program written in a high-level language, it is easy to overestimate its possible control flow paths, whereas it is hard to do so for a virus because of call/pop and push/ret sequences whose control flow approximation already requires some data-flow analysis.

An iterative approach may be appropriate, where control flow is first estimated heuristically by tracing the code and applying some reasonable rules (calls always return, exceptions do not occur), and then some data-flow analysis and optimization takes place. Then, based on the results of the data-flow analysis (steps 42, 43, 49), some control flow paths are added and some are removed (step 44). Finally, parts of data-flow analysis and optimization results are invalidated, and recomputed in the next pass of the iteration loop 40.

Reduction of the Control Flow Graph

Once dead code elimination 62 has removed useless instructions from basic blocks and code motion 49 has moved instructions across block boundaries, some blocks may turn out empty, or almost empty.

If a block is empty, except maybe for a last unconditional branch, the control flow can be modified 44 so that predecessors of the block branch directly to the successor of the block, and the block can be removed.

If a block ends with a conditional branch to itself (the block is a loop), and if all instructions left in the block only determine the outcome of the branch, the block is a dummy loop and may be removed 44. Here is an example of a dummy loop taken from a sample of Win95/Zexam:

101704a:
   shrd eax, edx, 17
   imul ecx, ecx, ecx
   inc eax
   sub esi, a81a9913

```
mov eax, ecx
imul ebx, ebx, ebx
add ebp, b3c0136a
bsr ebx, ecx
btr ebx, 1f
not ebx
mov ecx, 11ece82
cmp esi, f5b744be
jnz 101704a
```

On exit from the loop, the processor flags and registers eax, ebx, ecx and ebp are dead (they are killed by the code following the loop). Global dead code elimination 63 yields the following code:

```
looptop:
   sub esi, a81a9913
   cmp esi, f5b744be
   jnz looptop
   mov esi, f5b744be
```

Figure 9A:
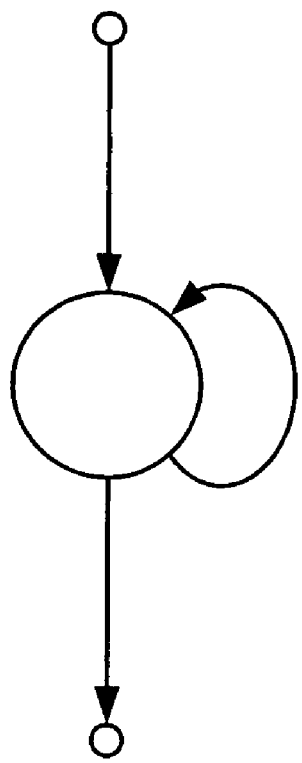
FIG. 9($a$) is a control flow graph for an exemplary section of code before reduction.
Figure 9B:

The control flow graph for this code is illustrated in FIG. 9(a). The assignment to register esi inserted after the loop does not change the meaning of the program, since it is redundant with the exit condition of the loop. This optimized loop now contains only instructions that affect its conditional branch, since the flags and esi are dead on exit. Therefore, the loop can be removed. (We assume that the loop exits at some point; in other words, it is not an infinite loop. Some heuristics can help in determining this.) The control flow graph for this code after loop removal is illustrated in FIG. 9(b).

As a result of dummy loops elimination, emulation of polymorphic decryptors 11 can become much faster, especially if loops can be nested.

Another useful reduction 44 of the control flow graph is the elimination of calls to blocks that contain a single "ret" instruction.

Specifying Boundary Conditions

Two types of information participate in the resolution of data-flow equations: data gathered from the nodes of the control flow graph (the basic blocks), and boundary conditions that apply on the start and exit nodes of the control flow graph. For instance, live variable analysis is a backwards analysis that propagates information up through the basic blocks. For the last basic block of a program (in execution order), it is customary to assume that all variables are dead on exit from the block. This boundary condition expresses the fact that no variables are ever going to be used after the program exits.

Boundary conditions are not so clear-cut in the case of programs containing self-modifying code. In a polymorphic virus 10, the decryptor 11 produces a piece of code 12 and then executes it 12. The set of live variables on exit from the decryptor 11 is hard to determine, because it depends on the register and memory usage of the code 12 it decrypts.

To be conservative, one can assume that all variables are live on exit from the decryptor 11, but it could lead to inefficient optimization in some cases. Another possibility is to guess that some variables are dead, optimize the decryptor 11 based on this assumption, emulate the resulting code 12, and then verify that the variables are actually dead by analyzing the decrypted code.

Rather than guessing boundary conditions, an alternative is to let a user specify them to the state tracking module 33 of the optimizer 39. More generally, allowing the user to specify conditions at various program points makes the optimizer 39 more flexible, and capable of handling buggy code produced by some polymorphic engines 10. Win32/Hezhi sometimes fails to finish its decryption loop 11 with a proper backwards jump. Win32/Simile.D produces some corruptions where the polymorphic decryptor 11 patches itself. User-supplied options would allow the optimizer 39 to circumvent these problems.

Compared with tracing, emulation, and X-raying, code optimization 40 can do one thing that none of these other techniques can, namely simplify code 30. Being able to work on readable code when analyzing the body 22 of a metamorphic virus 20 can be a tremendous help (see, e.g., Illustration D on Win95/Puron). Optimization 40 also makes exact identification of metamorphic virus 20 variants possible, based on their simplified body 22. Variant identification is an advantage for multiple reasons.

We use the term "tracing" to refer to the technique that consists in doing a partial disassembly of a program and attempting to follow its control flow based on simple rules. Typically, in tracing, only the length of instructions is calculated, except for branches that must be fully disassembled to follow them.

Tracing can be used to detect polymorphic decryptors 11 that present some easily recognizable characteristics, but are split into islands of code linked together by branches (Win32/Marburg, Win32/Orez.) It can also been used to detect metamorphic bodies 22 that use a weak form of metamorphism where some fixed instructions are always present.

The first phase of an optimizer 39 is instruction decoding, which is very similar to tracing in spirit. An optimizer 39 is slower than a tracer because of the extra work associated with full instruction decoding. However, it is usable in more situations, for instance when the code 30 contains indirect jumps through registers whose values are built dynamically. An efficient hybrid approach would be to simply trace the code 30 and check some decryptor characteristics up to a point where such a problematic indirect branch is used; then do a complete instruction decoding, followed by a data-flow analysis 42, 43, 49 on the subset of instructions that contribute to the branch destination (this subset is called a program slice).

Previous paragraphs already discussed several ways to make emulation faster by optimizing 40 the code 30 to emulate. In many situations, pattern matching on the optimized code can also replace emulation for the purpose of detection (see the below Illustrations), though emulation may still be needed for exact variant identification. For very complex polymorphic viruses 20, the emulation speed can be improved by factors of hundreds.

Systematically optimizing 40 code before emulating it results in a performance hit if the original code 30 is already as simple as it can be. However, the slowdown is by a small constant ratio. If local optimizations are used first and global optimizations take place only if local optimizations gave some improvements, the extra time is linear in the code 30 size. This is unlikely to be a problem, compared for instance to the cost of input/output.

As to X-raying, which is a technique that performs a known cleartext attack on the encrypted virus body, it might be replaced by optimization 40 when X-raying is used, because emulation of the decryptor would take too long, or when emulation is not an option because the virus produces buggy decryptors. Emulation of the optimized decryptor, or pattern matching on it, may be a viable alternative.

If X-raying is used because the virus uses Entry-Point Obscuring and the location of the decryptor is unknown (or, at least, not easily guessable), optimization 40 may not be able to help.

Dead Code Elimination as a Heuristic

Another use of optimization 40 is as a heuristic to detect polymorphic code 10. Most polymorphic engines 10 produce many redundant instructions, whereas a typical program has almost no dead code.

There are a few exceptions where dead code can be useful in a normal program. The use of nop instructions to allow pairing of instructions on superscalar processors, or to align loop top addresses on even boundaries can speed up execution. Dummy memory reads whose results are discarded are sometimes used to prefill the processor cache. Likewise, some processor instructions, like "pause" and other processor hints, are functionally dead but affect how the program runs.

However, the amount of dead code in the cases described above represents a very small percentage of the overall program. On the other hand, the dead code ratio in the output of polymorphic engines 10 is typically higher than 25%, and sometimes much more (see some examples in the below Illustrations.)

The presence of dead code by itself is not enough to declare a program viral, since polymorphic code 10 exists in legitimate executables, such as packed files (Aspack), but it is suspicious enough to warrant further investigation. Therefore, a method embodiment of the present invention comprises performing a dead code elimination procedure on the computer code 30; noting the amount of dead code eliminated during the dead code elimination procedure; and when the amount of dead code eliminated during the dead code elimination procedure exceeds a preselected dead code threshold, declaring a suspicion of malicious code in the computer code 30.

III. Illustrations

The data presented here were obtained by running a prototype optimizer 39 containing most of the modules described above on some code samples of polymorphic 10 and metamorphic 20 viruses. In each case, we list the disassembly of the original code 30, followed by the output of the optimizer 39.

Illustration A

Win95/Zperm.B

Win95/Zperm is a metamorphic virus 20 that permutates its body 22. This example shows part of the API resolution routine, before and after jump removal.

Original code:

```
4118db:  stosd
4118dc:  mov    eax, ae17c571
4118e1:  call   edx
4118e3:  jmp    41b65b
418184:  mov    eax, 1fc0eaee    ; entry-point
418189:  call   edx
41818b:  jmp    4118db
418534:  stosd
419657:  mov    eax, 7b4842c1
41965c:  call   edx
41965e:  stosd
41965f:  mov    eax, 32432444
419664:  call   edx
419666:  jmp    418534
41b65b:  stosd
41b65c:  jmp    419657
```

Optimized Code:

```
mov    eax, 1fc0eaee
call   edx
stosd
mov    eax, ae17c571
call   edx
stosd
mov    eax, 7b4842c1
call   edx
stosd
mov    eax, 32432444
call   edx
stosd
```

Since the calls are in order in the optimized code, a simple search string can be used to detect the virus 20.

Illustration B

Win95/Zmorph

Win95/Zmorph is a polymorphic virus 10 that builds it body 12 on the stack. This example illustrates constant folding 53.

Original Code:

```
4122a7:  mov    ebx, d1632349
4122ac:  mov    edx, 38d9cdd5
4122b1:  add    ebx, 810ad92a
4122b7:  mov    esi, dcf4a826
4122bc:  rol    edx, b
4122bf:  sub    esi, 4c641727
4122c5:  xor    edx, 8963fd03
4122cb:  add    ebx, ad8ddd76
4122d1:  mov    eax, 38c30f5d
4122d6:  mov    ecx, dded6aa9
4122db:  not    ecx
4122dd:  sub    eax, 77b356f7
4122e2:  mov    edi, 4c618901
4122e7:  bts    edi, b
4122eb:  add    edi, 8833c388
4122f1:  ror    ecx, 15
4122f4:  push   esi
4122f5:  push   ebx
4122f6:  bswap  edx
4122f8:  push   eax
4122f9:  xor    esi, ecx
4122fb:  xor    eax, 1592fcef
412300:  imul   ebx, ebx, 30e081f5
412306:  push   edi
412307:  bts    esi, b
412306:  add    edi, f42bc34b
```

Optimized Code:

```
push   909090ff
push   fffbd9e9
push   c10fb866
push   d4954c89
mov    edi, d4954c89
add    edi, f42bc34b
mov    eax, d49d4489
mov    ecx, 94aab110
mov    edx, c5540d47
mov    ebx, 40b5f4fd
mov    esi, 43a29ef
mov    edi, c8c10fd4
```

The four highlighted pushes create the tail of the virus 10, and they can be used for 19 detection. The movs and the add reflect the processor state at the end of block.

Illustration C

Win95/Zmist.A

Win95/Zmist is a metamorphic and entry-point obscuring virus 20. This example illustrates constant folding 53. (The entry-point of the virus body 22 was given as a parameter to the optimizer 39.)

Original Code:

```
404945:  jmp     40494a
40494a:  pusha
40494b:  xor     eax, eax
40494d:  sub     eax, 87868600
404952:  push    eax
404953:  xor     eax, 7274542e
404958:  push    eax
404959:  add     eax, 245f3e33
40495e:  push    eax
40495f:  xor     eax, 48181f08
404964:  push    eax
404965:  sub     eax, 19540004
40496a:  push    eax
40496b:  mov     esi, esi
40496d:  xor     eax, 204f1045
404972:  push    eax
404973:  mov     eax, eax
404975:  add     eax, f9ff064e
40497a:  push    eax
40497b:  xor     eax, 1501044e
404980:  push    eax
404981:  sub     eax, 9fb03a9
404986:  push    eax
404987:  push    esp
404988:  push    d0498cd4
```

Optimized Code:

```
         pusha
         push    78797a00
         push    a0d2e2e
         push    2e6c6c61
         push    66747369
         push    4d207365
         push    6d6f6320
         push    676e696e
         push    726f6d20
         mov     eax, 726f6d20
         sub     eax, 9fb03a9
         push    68746977
         push    esp
         push    d0498cd4
         mov     eax, 68746977
```

The data pushed on the stack is a text that reads "with morning comes Mistfall . . . " and can be used for detection. The movs and add that are left would be removed by global dead code elimination 63 if the analysis context was extended to include the code following this snippet.

Illustration D

Win95/Puron

Win95/Puron is a metamorphic virus 20 that mixes dead code with the meaningful instructions of its body 22, and splits its body 22 into islands of code linked by jumps.

This example is taken from the routine that searches the address base of the kernel module in memory. It illustrates dead code elimination and jump removal.

Original Code:

```
40a3a5:  lea     esi, [edi+62309cc]
40a3ab:  pop     ebx
40a3ac:  jnz     40aa2f
40a3b2:  lea     esi, [edi+3627dfc]
40a3b8:  push    ecx
40a3b9:  sub     ecx, 400
40a3bf:  pop     ecx
40a3c0:  mov     ebp, 6626b32
40a3c5:  jmp     40a517
40a517:  mov     bh, dh
40a519:  movsx   ebp, bh
40a51c:  jmp     40aa1a
40a5d6:  dec     edx             ; entry-point
40a5d7:  mov     ebp, 2ee8d12
40a5dc:  jmp     40abf9
40a6e8:  mov     ecx, dword [edx+3c]
40a6eb:  mov     ebx, ebp
40a6ed:  mov     esi, 4f5ce1f
40a6f2:  mov     bh, b1
40a6f4:  cmp     word [edx], 5a4d
40a6f9:  push    ecx
40a6fa:  mov     ebx, ebp
40a6fc:  lea     esi, [edi+3fee834]
40a702:  jmp     40a3a5
40a756:  pop     eax
40a757:  mov     ebx, ebp
40a759:  mov     esi, 4b5d687
40aa1a:  jbe     40aa28
40aa1c:  xor     ecx, ecx
40aa1e:  mov     bh, e1
40aa20:  lea     ebp, [edx+7c50c63]
40aa26:  mov     edi, esi
40aa28:  cmp     dward [edx+ecx], 4550
40aa2f:  popa
40aa30:  mov     ebx, edx
40aa32:  mov     esi, 70b62af
40aa37:  jnz     40a5d6
40aa3d:  jmp     40aadc
40aab4:  pusha
40aab5:  jmp     40a6e8
40aadc:  pap     dward [0]
40aae3:  mov     ebx, ebp
40aae5:  mov     bh, dh
40aae7:  mov     ebx, 5b2b5d8
40aaec:  lea     edi, [ebp+65e63a2]
40aaf2:  jmp     40a756
40abf9:  xor     edi, 78f710c
40abff:  mov     ebx, 64891f8
40ac04:  mov     al, bh
40ac06:  mov     ecx, eax
40ac08:  jmp     40aab4
```

Optimized Code:

```
block 0
    dec   edx
    xor   edi, 78f710c
    mov   al, 91
    mov   ecx, eax
    mov   ebx, 64891f8
    mov   ebp, 2ee8d12
    pusha
    mov   ecx, dword [edx+3c]
    cmp   word [edx], 5a4d
    push  dword [edx+3c]
    pop   ebx
    jnz   2             ; destinations are block numbers
block 1
    push  ecx
    sub   ecx, 400
    pop   ecx
    jbe   5
block 4
```

-continued

```
         mov    ecx, 0
block 5
         cmp    dword [edx+ecx], 4550
block 2
         popa
         mov    esi, 70b62af
         jnz    0
block 3
         pop    dword [0] ; an fs: selector is missing
         lea    edi, [ebp+65e63a2]
         pop    eax
         mov    ebx, ebp
         mov    esi, 4b5d687
```

The highlighted instructions are dead code that remains because of the pusha instruction in block 0. Pusha uses all registers, which is why the register assignments preceding it seem necessary. In fact, the pushed registers are later popped in block 2 and discarded. This "tunnel effect" can be avoided by using a fine-grained live variable analysis on the stack elements.

Notice also the presence of a push/pop sequence in block 0. The sequence was not peephole-optimized 52 into a mov, because the two instructions are separated by dead instructions in the original code, and the peephole optimization 52 took place before dead code elimination 62. As a result, even though ebx is dead after the "pop ebx" because it is killed by the popa instruction later, the push/pop pair remains because of its use of the stack. The prototype optimizer 39 used in this Illustration does not implement the dependency DAG construction described earlier, which would resolve this problem.

Illustration E

Win32/Dislex

Win32/Dislex is a complex polymorphic virus 10 based on the Lexotan engine. This example is taken from the polymorphic loop 11 that decrypts the data area 12 of the virus 10. Once decrypted, the content of the data area 12 can be used for detection. This example illustrates the use of optimization 40 to speed up emulation.

Original Code:

```
         4030ca:  pusha
         4030cb:  jmp     4041c2
         4032ef:  add     edx, ebx
         4032f1:  inc     edi
         4032f2:  movzx   edi, dl
         4032f5:  jmp     403809
         403728:  jnz     406d35
         40372e:  mov     edi, 7ce07ac
         403733:  mov     edi, ebp
         403735:  movzx   edi, dl
         403738:  jmp     408841
         4037cb:  push    eax         ; entry-point
         4037cc:  jmp     4030ca
         403809:  mov     dword [esi+ffffffc], eax
         40380c:  lea     edi, [ebp+7f9a292]
         403812:  jmp     406ff5
         403e90:  mov     edx, dword [40947e]
         403e96:  mov     edi, ebp
         403e98:  jmp     406ef7
         4041c2:  lea     ebp, [edx+5a5f84b]
         4041c8:  mov     eax, ecx
         4041ca:  mov     di, ab04
         4041ce:  mov     ah, dh
         4041d0:  movzx   ebp, al
         4041d3:  movsx   edi, dx
         4041d6:  or      edi, 76d9ecc
         4041dc:  lea     eax, [ecx+5e4f6]
         4041e2:  and     ah, ce
         4041e5:  jmp     404780
         404780:  mov     esi, 4091ca
         404785:  lea     eax, [ecx+64f77a6]
         40478b:  mov     ah, 32
         40478d:  add     ah, 8a
         404790:  add     ah, e2
         404793:  mov     ah, 2e
         404795:  mov     ah, dh
         404797:  sub     eax, 5731a19
         40479d:  push    ad
         4047a2:  lea     ebp, [edx+b6dfddb]
         4047a8:  lea     edi, [ebp+2785942]
         4047ae:  mov     eax, 4e1bb89
         4047b3:  lea     ebp, [edx+52613cb]
         4047b9:  lea     edi, [ebp+2dd96f2]
         4047bf:  mov     eax, 4b398f9
         4047c4:  inc     edi
         4047c5:  mov     ah, dh
         4047c7:  mov     ah, dl
         4047c9:  or      edi, 707681c
         4047cf:  adc     ah, c6
         4047d2:  jmp     405e2b
         405e2b:  pop     ecx
         405e2c:  sbb     eax, 25d07d9
         405e32:  mov     edi, ebp
         405e34:  mov     eax, 246d911
         405e39:  sub     eax, 2029949
         405e3f:  cmp     ebp, 54ea55a
         405e45:  movsx   eax, bh
         405e48:  mov     bp, 85b2
         405e4c:  jmp     403e90
         406d35:  lodsd
         406d36:  or      edi, 7bb6e04
         406d3c:  mov     edi, ebp
         406d3e:  sbb     edi, 7586034
         406d44:  movzx   edi, dx
         406d47:  lea     edi, [ebp+63d582]
         406d4d:  lea     edi, [ebp+3292da]
         406d53:  xor     eax, edx
         406d55:  mov     di, 894
         406d59:  movzx   edi, dx
         406d5c:  jmp     4032ef
         406ef7:  mov     ebx, dword [409482]
         406efd:  mov     edi, ebp
         406eff:  mov     ax, 7029
         406f03:  lea     edi, [ebp+2f28d72]
         406f09:  lea     edi, [ebp+3d8c512]
         406f0f:  or      edi, 467e90c
         406f15:  movsx   edi, dl
         406f18:  lea     edi, [ebp+4563c1a]
         406f1e:  mov     edi, 4c467d4
         406f23:  jmp     406d35
         406ff5:  lea     edi, [ebp+10258ca]
         406ffb:  movsx   edi, dl
         406ffe:  mov     edi, ebp
         407000:  mov     edi, ebp
         407002:  movzx   edi, dx
         407005:  mov     di, cf84
         407009:  mov     edi, ebp
         40700b:  mov     di, 21b4
         40700f:  mov     di, f34c
         407013:  jmp     407d1b
         407d1b:  dec     ecx
         407d1c:  lea     edi, [ebp+7709302]
         407d22:  movzx   edi, dl
         407d25:  jmp     403728
         408841:  lea     ebx, [eax+18346b1]
         408847:  mov     ebp, edx
```

Optimized Code:

```
          block 0
              push    eax
              pusha
              mov     esi, 4091ca
              push    ad
              pop     ecx
              mov     edx, dword [40947e]
              mov     ebx, dword [409482]
          block 1
              lodsd
              xor     eax, edx
              add     edx, ebx
              mov     dword [esi+fffffffc], eax
              dec     ecx
              jnz     1         ; destinations are block numbers
          block 2
              movzx   edi, dl
              lea     ebx, [eax+18346b1]
              mov     ebp, edx
```

The original loop 11 contains more than thirty instructions, whereas the optimized loop contains six instructions. Emulating the optimized code 37 will thus speed up emulation by a factor of five. In some cases, Win32/Dislex will produce loops with hundreds of dead instructions, making the benefit of optimizing before emulation even greater.

Illustration F

Win32/Simile.A

Win32/Simile is a polymorphically-encrypted metamorphic virus 20. This example is taken from part of a decryptor 21 that resolves the address of the VirtualAlloc API function dynamically. This example illustrates copy propagation 54, constant folding 53, and dead code elimination 62.

Original Code:

```
          4000b0dd:  mov    dword [40023380], eax
          4000b0e3:  mov    edx, 416c6175
          4000b0e8:  mov    ecx, edx
          4000b0ea:  push   74726956
          4000b0ef:  pop    dword [4002421b]
          4000b0f5:  mov    edi, dword [4002421b]
          4000b0fb:  mov    dword [40023480], 99ff02a7
          4000b105:  xor    dword [40023480], 2649b0b1
          4000b10f:  xor    dword [40023480], dcd9de7a
          4000b119:  push   dword [40023480]
          4000b11f:  pop    dword [40023b5b]
          4000b125:  mov    esi, dword [40023b5b]
          4000b12b:  clc
          4000b12c:  lea    ebp, [esi]
          4000b12e:  lea    ebx, [ecx]
          4000b131:  mov    dword [40023374], ebx
          4000b137:  mov    dword [40023370], edi
          4000b13d:  mov    dword [40023378], ebp
          4000b143:  lea    edi, [8aba1f6b]
          4000b149:  add    edi, 7545e095
          4000b14f:  lea    ecx, [edi]
          4000b151:  mov    dword [4002337c], ecx
          4000b157:  lea    ecx, [e49e73bc]
          4000b15d:  add    ecx, 5b63bfb4
          4000b163:  mov    dword [400238a0], ecx
          4000b169:  push   dword [400238a0]
          4000b16f:  mov    eax, dword [40023380]
          4000b175:  clc
          4000b176:  mov    ecx, eax
          4000b178:  mov    dward [40024113], ecx
          4000b17e:  push   dward [40024113]
          4000b184:  mov    edi, 400253a8
          4000b18a:  call   dword [edi]
```

Optimized Code:

```
          mov     dword [40023380], eax
          push    40023370
          mov     dword [40024113], eax
          push    eax
          mov     ebx, 416c6175
          mov     ebp, 636f6c6c
          mov     esi, 636f6c6c
          mov     edi, 400253a8
          mov     byte [40023370], 56     ; V
          mov     byte [40023371], 69     ; i
          mov     byte [40023372], 72     ; r
          mov     byte [40023373], 74     ; t
          mov     byte [40023374], 75     ; u
          mov     byte [40023375], 61     ; a
          mov     byte [40023376], 6c     ; l
          mov     byte [40023377], 41     ; A
          mov     byte [40023378], 6c     ; l
          mov     byte [40023379], 6c     ; l
          mov     byte [4002337a], 6f     ; o
          mov     byte [4002337b], 63     ; c
          mov     byte [4002337c], 0
          mov     byte [4002337d], 0
          mov     byte [4002337e], 0
          mov     byte [4002337f], 0
          mov     byte [40023480], 6c
          mov     byte [40023481], 6c
          mov     byte [40023482], 6f
          mov     byte [40023483], 63
          mov     byte [400238a0], 70
          mov     byte [400238a1], 33
          mov     byte [400238a2], 2
          mov     byte [400238a3], 40
          mov     byte [40023b5b], 6c
          mov     byte [40023b5c], 6c
          mov     byte [40023b5d], 6f
          mov     byte [40023b5e], 63
          mov     byte [4002421b], 56
          mov     byte [4002421c], 69
          mov     byte [4002421d], 72
          mov     byte [4002421e], 74
          call    dword [400253a8]        ; va of GetProcAddress
```

The highlighted parts can be used for pattern matching.

The optimized code 37 is longer than the original, but this is simply a consequence of expressing the memory state on exit from the block as a series of byte assignments. The flags and registers eax, ecx, and edx are considered dead on entry into GetProcAddress, which allows some dead code elimination 62. The other registers and all memory locations are considered live, to be conservative, but global dead code elimination 63 across API calls could help simplify the code further.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-implemented method for determining whether computer code contains malicious code, said method comprising the steps of:
   identifying computer code having a decryption loop and a body;
   performing a dead code elimination procedure on the computer code;
   noting an amount of dead code eliminated during the dead code elimination procedure;
   responsive to the amount of dead code eliminated during the dead code elimination procedure exceeding a preselected dead code threshold, declaring a suspicion of malicious code in the computer code;
   optimizing the decryption loop to produce optimized loop code;
   performing a malicious code detection procedure on the optimized loop code; and
   responsive to the malicious code detection procedure detecting malicious code in the optimized loop code declaring that the computer code contains malicious code.

2. The method of claim 1 wherein optimizing the decryption loop comprises performing at least one technique from the group of techniques consisting of constant folding, copy propagation, non-obvious dead code elimination, code motion, peephole optimization, abstract interpretation, instruction specialization, and control flow graph reduction.

3. The method of claim 2 wherein at least two of said techniques are combined synergistically.

4. The method of claim 1 wherein the malicious code detection procedure is a procedure from the group of procedures consisting of pattern matching, emulation, checksumming, heuristics, tracing, and algorithmic scanning.

5. The method of claim 1, further comprising:
   optimizing a body of the computer code to produce optimized body code;
   subjecting the optimized body code to a malicious code detection protocol; and
   responsive to the malicious code detection protocol detecting malicious code in the optimized body code, declaring that the computer code contains malicious code.

6. The method of claim 5 wherein the malicious code detection protocol is a protocol from the group of protocols consisting of pattern matching, emulation, checksumming, heuristics, tracing, X-raying, and algorithmic scanning.

7. The method of claim 5 wherein the step of optimizing the body comprises using at least one output from the group of steps consisting of optimizing the decryption loop and performing a malicious code detection procedure on the optimized loop code.

8. The method of claim 5 wherein, when the step of performing a malicious code detection procedure on the optimized loop code indicates the presence of malicious code in the computer code, the steps of optimizing the body and subjecting the optimized body code to a malicious code detection protocol are aborted.

9. The method of claim 1 further comprising the additional step of, after the step of performing a malicious code detection procedure on the optimized loop code, revealing an encrypted body.

10. The method of claim 9 wherein the step of revealing an encrypted body comprises emulating the optimized loop code.

11. The method of claim 9 wherein the step of revealing an encrypted body comprises applying a key gleaned from the optimized loop code.

12. The method of claim 1, wherein optimizing the decryption loop to produce optimized loop code comprises:
   performing a forward pass operation;
   performing a backward pass operation;
   performing a control flow graph reduction; and
   iterating the above three steps a plurality of times.

13. The method of claim 12 wherein the iteration of the three steps stops after either:
   a preselected number of iterations; or
   observing that no optimizations of the computer code were performed in the most recent iteration.

14. The method of claim 12 further comprising the step of performing a code motion procedure, wherein the four steps are iterated a plurality of times.

15. The method of claim 12 wherein the forward pass operation comprises one or more steps from the set consisting of:
   peephole optimization;
   constant folding;
   copy propagation;
   forward computations related to abstract interpretation; and
   instruction specialization.

16. The method of claim 12 wherein the backward pass operation comprises one or more steps from the set consisting of backward computations related to abstract interpretation and local dead code elimination.

17. The method of claim 16 wherein the backward pass operation comprises the additional step of global dead code elimination.

18. The method of claim 1 wherein the malicious code detection procedure comprises emulating the optimized loop code.

19. A computer-readable storage medium containing executable computer program instructions for determining whether computer code contains malicious code, said computer program instructions performing the steps of:
   identifying computer code having a decryption loop and a body;
   performing a dead code elimination procedure on the computer code;
   noting an amount of dead code eliminated during the dead code elimination procedure;
   responsive to the amount of dead code eliminated during the dead code elimination procedure exceeding a preselected dead code threshold, declaring a suspicion of malicious code in the computer code;
   optimizing the decryption loop to produce optimized loop code;
   performing a malicious code detection procedure on the optimized loop code; and
   responsive to the malicious code detection procedure detecting malicious code in the optimized loop code declaring that the computer code contains malicious code.

20. The computer-readable medium of claim 19 wherein the malicious code detection procedure is a procedure from the group of procedures consisting of pattern matching, emulation, checksumming, heuristics, tracing, X-raying, and algorithmic scanning.

21. The computer-readable medium of claim 19 wherein optimizing the decryption loop comprises performing at least one technique from the group of techniques consisting of constant folding, copy propagation, non-obvious dead code elimination, code motion, peephole optimization, abstract interpretation, instruction specialization, and control flow graph reduction.

22. The computer-readable medium of claim 19, wherein the computer program instructions are for further performing the steps of:

optimizing a body of the computer code to produce optimized body code;

subjecting the optimized body code to a malicious code detection protocol; and responsive to the malicious code detection protocol detecting malicious code in the optimized body code, declaring that the computer code contains malicious code.

* * * * *